Nov. 20, 1951     P. L. HUTCHINS     2,575,813
CONVEYER BELT
Filed April 1, 1946
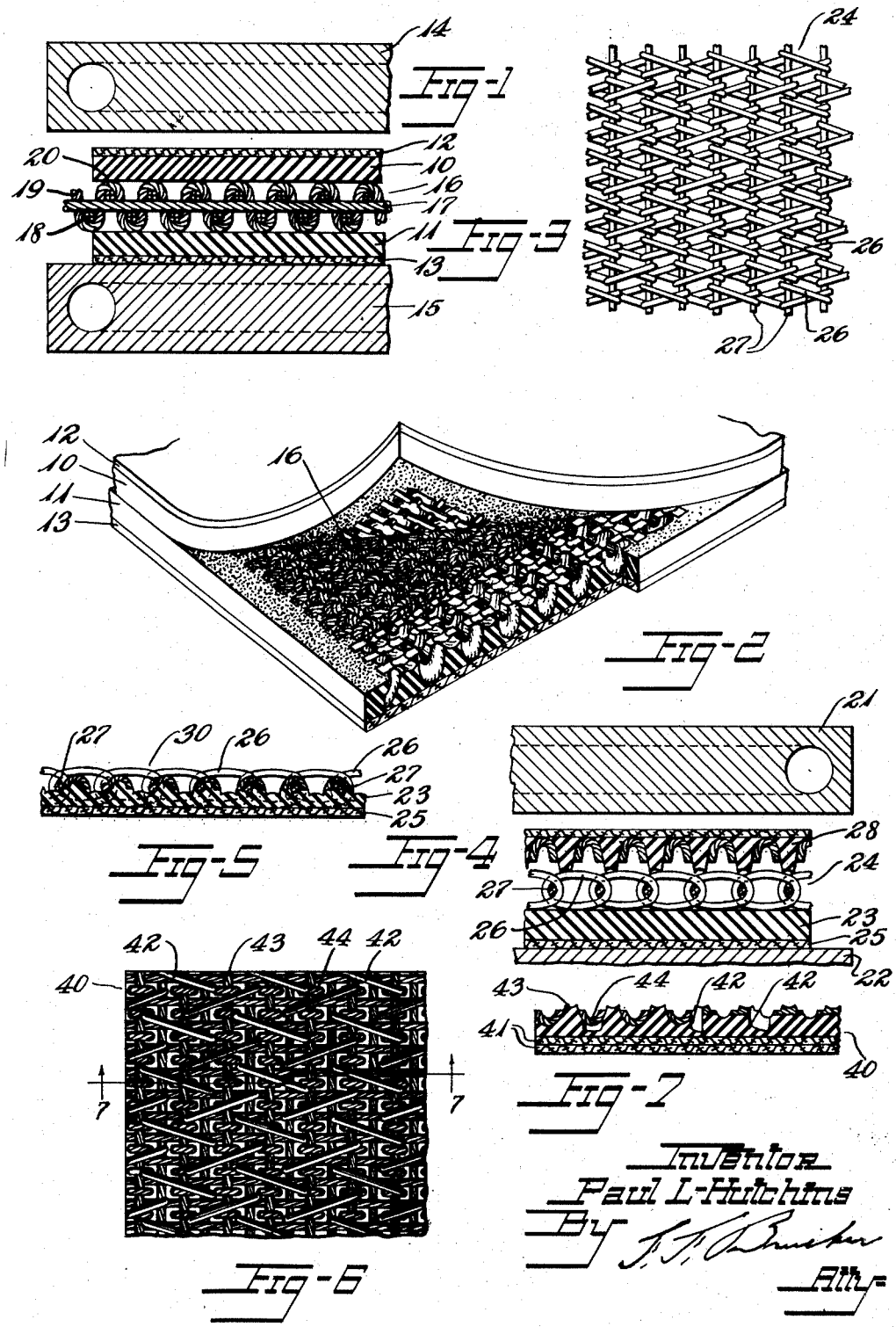
Inventor
Paul L. Hutchins
By
Atty.

Patented Nov. 20, 1951

2,575,813

UNITED STATES PATENT OFFICE 2,575,813

CONVEYER BELT

Paul L. Hutchins, Cuyahoga Falls, Ohio, assignor to The B. F. Goodrich Company, New York, N. Y., a corporation of New York Application April 1, 1946, Serial No. 658,633

12 Claims. (Cl. 198—198)

This invention relates to molding surfaces of plastic material and is especially useful in producing a rough patterned surface over the face of a conveyor belt or other flat article of rubber-like material.

In the manufacture of conveyor belts for handling packages, it is desirable to provide the load-contacting face of the belt with rough projections and depressions for increasing the hold of the belt on the packages. Package-handling conveyor belts are of extensive area and are vulcanized in long steam-heated presses. To provide metal molds of a size to fit such a press would be extremely expensive.

Heretofore, it has been proposed to mold such a belt by embedding a coarse woven fabric in the face of a layer of plastic rubber composition, to vulcanize the rubber composition, and then to use the resulting matrix with coarse fabric face to mold the surface of the belt, as in the Reimel Patent No. 2,147,218. While such a process has been highly successful, the matrix so found is of limited useful life due to the fact that the rubber material cracks and the woven material eventually crushes in use.

Objects of the present invention are to provide for resisting cracking of the matrix to provide a molding surface of the desired complex roughness, to provide projection and indentations of greater depth and variety of form, to provide an improved matrix of increased useful life, and to provide an improved belt product.

A further object is to provide for making a multiplicity of molds and resulting products from each original fabric used for reproduction.

These and other objects will appear from the following description and the accompanying drawings.

Of the drawings,

Fig. 1 is a cross-sectional view illustrating a step in the operation of forming a primary matrix, showing a pair of press platens and interposed materials.

Fig. 2 is a perspective view showing a textile material partially embedded in rubber-like material to form a pair of primary matrices, and partially removed therefrom.

Fig. 3 is a plan view of a portion of a layer of wire fabric.

Fig. 4 is a cross-sectional view illustrating another step in the operation of forming a final molding matrix or mold, showing a pair of press platens and interposed materials.

Fig. 5 is a cross-sectional view of a finished wire fabric reinforced matrix or mold.

Fig. 6 is a plan view of a portion of the completed belt surface.

Fig. 7 is a cross-sectional view of the completed belt.

Referring to the drawings, the first step in preparing a molding matrix corresponding to and embodying the invention is illustrated in Fig. 1. Pads 10, 11 of unvulcanized rubber or other rubber-like material, backed against spreading by layers 12, 13 respectively of rubberized fabric are placed between heated press platens 14, 15. A layer 16 of coarsely woven textile material is placed between the two pads, the pads being dusted with powdered soapstone or other dusting material to prevent sticking of the pads to the fabric. A suitable fabric for the purpose is a stiff coarse fabric formed of heavy hemp or sisal yarns of which straight filler yarns 17 and straight warps 18 are interwoven with crimped filler yarns 19 forming upstanding loops 20 at each face of the fabric. The heated platens are forced toward each other to embed the fabric in the rubber-like material and are heated to flow the material and vulcanize it.

After vulcanization is complete, the platens are separated and the assembled material is removed. Then the pad material is separated from the fabric, as illustrated in Fig. 2, to provide a pair of primary matrices, either of which may be employed in the succeeding operations. Each matrix will have the impression of the textile material in its face and is useful in making a number of final matrices or molds.

One of the primary matrices produced by the preceding steps, and designated 28 in Fig. 4, is then placed between heated press platens 21, 22 together with a pad of unvulcanized rubber or other rubber-like material 23 and a layer 24 of metallic fabric. The pad 23 has a backing 25 of rubberized fabric or other reinforcing material affixed thereto to prevent spreading thereof. The metal fabric is substantially as thick as the unvulcanized pad and is of stiff metal wire, preferably steel, which may be formed with a field of upstanding loops 26 or intercoiled wire coils and straight wires 27 extending through intercalated loops of adjoining coils. Such a wire fabric is illustrated in Fig. 3 of the drawings. Other suitable wire fabrics may, however, be employed.

With the wire fabric 24 located between the primary matrix 28 and the pad 23, pressure is applied to the assembly by the heated platens to embed the wire fabric in the pad 23 and at the same time to impress the face of the pad 23 with the rough face of the matrix 28 and its coarse fabric impression, between the embedded loops 27 of the wire fabric. The face of the matrix 28 is protected against adhesion to the pad by a dusting of soapstone dust or other lubricating material.

Under the heat and pressure, the pad 23 becomes vulcanized. The press platens are then separated and the finished mold or matrix 30, illustrated in section in Fig. 5, is removed therefrom. The matrix 30 has the rough fabric impression of the matrix 28 on its face and at the same time has the wire fabric embedded therein so that it is strongly reinforced by the wire fabric against spreading, while, at the same time, the wire loops 26 protrude at the face of the matrix to provide additional molding surfaces. The indentations and projections of the rubber-like material are of less altitude than the exposed loops so as to be supported thereby against crushing and spreading.

In the manufacture of a conveyor belt such as illustrated in Figs. 6 and 7, the unvulcanized belt material having the necessary body 41 of textile fabric or cords and an unvulcanized layer of rubber or other rubber-like material at its face, is placed in a belt vulcanizing press, and the matrix 30 is superimposed thereon. Heat and pressure are then applied to mold and vulcanize the face of the belt to conform to the face of the matrix. As shown in Fig. 6, the resulting belt 40 has deep grooves 42 formed by the exposed coils of the wire fabric arranged in ranks of oblique grooves, with the grooves of successive rows inclined obliquely in opposite directions, and between the grooves 42 the surface is formed with projections 43 and indentations 44 of less depth than the grooves 42 and having a form resulting from molding contact with the matrix 28. Such a belt is well adapted for conveying packages and the like.

In addition to the improved rough character of the final products, the invention has the advantage of making it possible to multiply greatly the number of reproductions of the original fabric, both as to molds and final products.

Variations may be made without departing from the scope of the invention as it is defined by the following claims.

I claim:

1. A mold for forming an impression on the face of moldable material, said mold comprising a web of wire fabric material having high resistance to spreading and presenting loops of wire at a face of the web, and a layer of vulcanized rubber-like material in which said wire fabric material is partially embedded with portions of said loops exposed to present said loops together with extensive portions of the surface of the rubber-like material between the wire loops as a molding face.

2. A mold for forming an impression on the face of moldable material, said mold comprising a web of wire fabric material having a high resistance to spreading and presenting loops of wire at a face of the web, and a layer of vulcanized rubber-like material in which said wire fabric material is partially embedded with portions of said loops exposed to present said loops together with extensive portions of the surface of the rubber-like material between the wire loops as a molding face, the face of said layer of rubber-like material exposed between said exposed loop portions having the form of indentations and projections.

3. A mold for forming an impression on the face of moldable material, said mold comprising a web of wire fabric material having a high resistance to spreading and presenting loops of wire at a face of the web, and a layer of vulcanized rubber-like material in which said wire fabric material is partially embedded with portions of said loops exposed to present said loops together with extensive portions of the surface of the rubber-like material between the wire loops as a molding face, the face of said layer of rubber-like material exposed between said exposed loop portions having the form of indentations and projections, and said projections being of less altitude than said exposed portions of said loops.

4. The method of making a mold for forming an impression on the face of moldable material which comprises forming a matrix of rubber-like material by impressing a face thereof with a coarse textile material, partially and permanently embedding a web of wire fabric material having loops of wire at a face thereof in another layer of vulcanized rubber-like material by application of pressure thereto through said matrix, simultaneously forming extensive portions of the surface of the second said layer of rubber-like material by the said application of pressure by said matrix to provide between said loops exposed molding surfaces of indentations and projections of said rubber-like material of less altitude than said exposed portions of said loops in the finished mold, and vulcanizing said rubber-like material.

5. The method of permanently mounting a wire fabric facing material in a plastic backing while providing a mold face on the backing, which comprises partially embedding the wire fabric facing material in the plastic backing by pressure applied to the facing material through a layer of vulcanized yielding material having a matrix face provided with projections and indentations distortable by pressure contact with said wire fabric but more firm than said plastic backing so that said matrix face is impressed on extensive portions of said plastic backing in the interstices of said wire fabric facing material, and removing from said matrix face the plastic backing with its embedded wire fabric facing material to present the latter as a mold face for subsequent molding of articles against the same.

6. A conveyor belt comprising a reinforced body of vulcanized rubber-like material having a resilient work-engaging face, said face comprising an extensive area of rough projections of the rubber-like material with shallow indentations between the projections, some of said indentations extending longitudinally and some laterally of the belt, deeper short indentations extending longitudinally of the belt and interrupting the continuity of the laterally extending shallow indentations, all of said indentations having diagonally striated surfaces, and still deeper grooves also in said extensive area, said deeper grooves having smooth surfaces and each intersecting a plurality of said lateral shallow indentations.

7. A conveyor belt comprising a reinforced body of vulcanized rubber-like material having a resilient work-engaging face, said face comprising an extensive area of rough projections of the rubber-like material with shallow indentations between the projections, some of said indentations extending longitudinally and some laterally of the belt, deeper short indentations extending longitudinally of the belt and interrupting the continuity of the laterally extending shallow indentations, all of said indentations having diagonally striated surfaces of the impression of coarse textile fabric, and still deeper grooves also in said extensive area, said deeper grooves having smooth surfaces of the impression of wire fabric and each intersecting a plurality of said shallow indentations.

8. A conveyor belt comprising a reinforced body of vulcanized rubber-like material having a resilient work-engaging face, said face comprising an extensive area of rough projections of the rubber-like material with shallow indentations between the projections, some of said indentations extending longitudinally and some laterally of the belt, deeper short indentations extending longitudinally of the belt and interrupting the continuity of the laterally extending shallow indentations, all of said indentations having diagonally striated surfaces, and still deeper grooves also in said extensive area, said deeper grooves having smooth surfaces and each intersecting a plurality of said lateral shallow indentations, said deeper grooves extending diagonally of the belt and being arranged in laterally extending ranks of grooves with the grooves of successive ranks of opposite angular inclination.

9. A conveyor belt comprising a reinforced body of vulcanized rubber-like material having a resilient work-engaging face, said face comprising an extensive area of rough projections of the rubber-like material with shallow indentations between the projections, some of said indentations extending longitudinally and some laterally of the belt, deeper short indentations extending longitudinally of the belt and interrupting the continuity of the laterally extending shallow indentations, all of said indentations having diagonally striated surfaces, and still deeper grooves also in said extensive area, said deeper grooves having smooth surfaces and each intersecting a plurality of said lateral shallow indentations, said deeper grooves extending diagonally of the belt and being arranged in laterally extending ranks of grooves with the grooves of successive ranks of opposite angular inclination, and the grooves of one rank being located between the grooves of adjacent ranks in overlapping relation.

10. A conveyor belt comprising a reinforced body of vulcanized rubber-like material having a resilient work-engaging face, said face comprising an extensive area of rough projections of the rubber-like material with shallow indentations between the projections, some of said indentations extending longitudinally and some laterally of the belt, deeper short indentations extending longitudinally of the belt and interrupting the continuity of the laterally extending shallow indentations, all of said indentations having diagonally striated surfaces of the impression of coarse woven textile yarns, and still deeper grooves also in said extensive area, said deeper grooves having smooth surfaces of the impression of a looped wire fabric and each intersecting a plurality of said lateral shallow indentations, said deeper grooves extending diagonally of the belt and being arranged in laterally extending ranks of grooves with the grooves of successive ranks of opposite angular inclination, and the grooves of one rank being located between the grooves of adjacent ranks in overlapping relation.

11. A conveyor belt comprising a reinforced body of vulcanized rubber-like material having a resilient work-engaging face comprising alternate projections and depressions said projections providing a multiplicity of sharp edges at the face of the belt to engage articles on said face and said depressions being relatively shallow, said face also having grooves therein deeper than said depressions, said grooves being arranged in ranks lateral of the belt with the grooves in each rank inclined to the longitudinal direction of the belt and with the grooves of successively adjacent ranks inclined in opposite directions and arranged in staggered overlapping relation to each other.

12. A conveyor belt comprising a reinforced body of vulcanized rubber-like material having a resilient work-engaging face comprising alternate projections and depressions said projections providing a multiplicity of sharp edges at the face of the belt to engage articles on said face and said depressions being relatively shallow, said face also having grooves therein deeper than said depressions, said grooves being arranged in ranks lateral of the belt with the grooves in each rank inclined to the longitudinal direction of the belt and with the grooves of successively adjacent ranks inclined in opposite directions, and the grooves of each rank overlapping the grooves of successively adjacent ranks and arranged in staggered overlapping relation to each other.

PAUL L. HUTCHINS.

REFERENCES CITED

The following references are of record in the file of this patent:

UNITED STATES PATENTS

| Number | Name | Date |
|---|---|---|
| 137,224 | Mansfield | Mar. 25, 1873 |
| 2,147,218 | Reimel | Feb. 14, 1939 |
| 2,380,230 | Gatke | July 10, 1945 |